US012059940B2

(12) United States Patent
Kim et al.

(10) Patent No.: US 12,059,940 B2
(45) Date of Patent: Aug. 13, 2024

(54) AIR CONDITIONER FOR VEHICLE

(71) Applicant: Hanon Systems, Daejeon (KR)

(72) Inventors: Tae Wan Kim, Daejeon (KR); Yong Eun Seo, Daejeon (KR); Tae Gun Lee, Daejeon (KR); Myoung Jun Kim, Daejeon (KR); Jong Gon Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 282 days.

(21) Appl. No.: 17/440,910

(22) PCT Filed: May 4, 2020

(86) PCT No.: PCT/KR2020/005877
§ 371 (c)(1),
(2) Date: Sep. 20, 2021

(87) PCT Pub. No.: WO2020/242073
PCT Pub. Date: Dec. 3, 2020

(65) Prior Publication Data
US 2022/0153083 A1    May 19, 2022

(30) Foreign Application Priority Data

May 24, 2019    (KR) .................. 10-2019-0060996

(51) Int. Cl.
*B60H 1/00*    (2006.01)
(52) U.S. Cl.
CPC ..... *B60H 1/00021* (2013.01); *B60H 1/00685* (2013.01); *B60H 1/00842* (2013.01); *B60H 2001/002* (2013.01)
(58) Field of Classification Search
CPC ............ B60H 1/00021; B60H 1/00664; B60H 1/00671; B60H 1/00685; B60H 1/00842;
(Continued)

(56) References Cited

U.S. PATENT DOCUMENTS 6,231,437 B1 * 5/2001 Loup .................. B60H 1/00671
454/160
6,319,112 B2 * 11/2001 Komowski ........ B60H 1/00849
454/139
(Continued)

FOREIGN PATENT DOCUMENTS

CN    103707737 A   *   4/2014    ......... B60H 1/00064
DE    112014000301 T5    9/2015
(Continued)

OTHER PUBLICATIONS

WO-2018221975-A1 English Machine Translation (Year: 2018).*
(Continued)

*Primary Examiner* — Jenna M Maroney
(74) *Attorney, Agent, or Firm* — Dickinson Wright PLLC

(57) ABSTRACT

An air conditioner for a vehicle, which includes an air conditioning case having an air passage formed therein, a cooling heat exchanger provided in the air passage of the air conditioning case to heat-exchange with air passing through the air passage, and a heating heat exchanger, comprises: a front seat temperature door which adjusts an opening degree between a front seat cold air passage and a part of a hot air passage; a first rear seat temperature door which is disposed between the cooling heat exchanger and the heating heat exchanger and adjusts an opening degree of another part of the hot air passage; and a second rear seat temperature door which is disposed in the downstream of the heating heat exchanger and adjusts an opening degree between the hot air passage and a rear seat cold air passage, wherein the second rear seat temperature door includes an asymmetric dome.

7 Claims, 14 Drawing Sheets

(58) Field of Classification Search
CPC .......... B60H 2001/00714; B60H 2001/00721; B60H 2001/002; B60H 2001/00092; B60H 2001/00164
See application file for complete search history.

(56) References Cited

U.S. PATENT DOCUMENTS

| | | | | |
|---|---|---|---|---|
| 6,482,081 | B2* | 11/2002 | Vincent | B60H 1/00064 165/42 |
| 6,913,529 | B2* | 7/2005 | Seki | B60H 1/00842 454/121 |
| 7,478,666 | B2* | 1/2009 | Yamamoto | B60H 1/00028 165/204 |
| 7,575,511 | B2* | 8/2009 | Haupt | B60H 1/00685 62/244 |
| 7,857,041 | B2* | 12/2010 | Fukagawa | B60H 1/00842 454/126 |
| 7,950,444 | B2* | 5/2011 | Masatsugu | B60H 1/00842 454/126 |
| 9,476,520 | B2* | 10/2016 | Haupt | F16K 47/045 |
| 9,919,576 | B2* | 3/2018 | Kim | B60H 1/00028 |
| 10,328,768 | B2* | 6/2019 | Iyer | B60H 1/00035 |
| 11,351,840 | B2* | 6/2022 | Seo | B60H 1/00064 |
| 11,541,716 | B2* | 1/2023 | Kim | B60H 1/00028 |
| 2001/0012756 | A1* | 8/2001 | Komowski | B60H 1/00685 454/8 |
| 2008/0032617 | A1* | 2/2008 | Fuentes | B60H 1/00064 454/142 |
| 2010/0224253 | A1* | 9/2010 | Azar | B60H 1/00678 454/333 |
| 2016/0152110 | A1* | 6/2016 | Kim | B60H 1/00057 165/203 |
| 2017/0217282 | A1* | 8/2017 | Iyer | B60H 1/00035 |
| 2018/0141404 | A1 | 5/2018 | Yeon | |
| 2020/0070618 | A1* | 3/2020 | Kim | B60H 1/00028 |
| 2020/0070625 | A1* | 3/2020 | Seo | B60H 1/246 |

FOREIGN PATENT DOCUMENTS

| | | | | |
|---|---|---|---|---|
| JP | 2002264633 | A | | 9/2002 |
| JP | 2010149566 | A | | 7/2010 |
| KR | 1020080041882 | A | | 5/2008 |
| KR | 101453366 | B1 | | 10/2014 |
| KR | 20180001697 | A | * | 1/2018 |
| KR | 101824438 | B1 | | 2/2018 |
| KR | 1020180132214 | A | | 12/2018 |
| KR | 1020190044893 | A | | 5/2019 |
| WO | WO-2018221975 | A1 | * | 12/2018 ......... B60H 1/00021 |

OTHER PUBLICATIONS

Written Opinion of the International Searching Authority and International Search Report for International Application No. PCT/KR2020/005877, mailed Aug. 18, 2020, 10 page(s), English Translation of International Search Report Included.

* cited by examiner

PRIOR ART

PRIOR ART

PRIOR ART

AIR CONDITIONER FOR VEHICLE

CROSS-REFERENCE TO RELATED APPLICATIONS

This application is a U.S. National Stage of International Patent Application Serial No. PCT/KR2020/005877, filed May 04, 2020, which claims the benefit of Korean Patent Application Serial No. 10-2019-0060996, filed May 24, 2019. The entire disclosures of each of the above applications are incorporated herein by reference.

TECHNICAL FIELD

The present invention relates to an air conditioner for a vehicle, and more particularly, to an air conditioner for a vehicle, which can send air conditioning air toward a rear seat in order to perform front seat air conditioning and rear seat air conditioning simultaneously in a vehicle.

BACKGROUND ART

In general, the vehicle air conditioner is a vehicle interior that is installed for the purpose of securing the driver's front and rear view by removing the frost from the windshield or heating in the summer or winter, or during the rain or winter season. As such, the air conditioner is usually equipped with a heating device and a cooling device at the same time to selectively introduce the outside air, and then heats or cools the air and blows it into the vehicle interior, thereby cooling, heating, or ventilating the interior of the vehicle.

Korean Patent No. 1484718 (granted on Jan. 14, 2015) discloses an air conditioner for a vehicle which adjusts the air volume of a rear seat by controlling locations of a rear seat temperature door, an auxiliary rear seat temperature door, and a rear seat on-off door. FIG. 1 is a sectional view illustrating a conventional air conditioner for a vehicle. As illustrated in FIG. 1, the conventional air conditioner for a vehicle includes an air conditioning case 10, an evaporator 20, a heater core 30, a front seat temperature door 51, and a front seat mode door.

The air conditioning case 10 includes an air inlet 11, air outlets, and an air passage formed therein. An air blower is connected to the air inlet 11, so that indoor air or outdoor air is selectively induced into the air passage of the air conditioning case 10. The air outlets are a defrost vent 12, a front seat face vent 13, a floor vent 114, a rear seat face vent 15, and a rear seat floor vent 16. The air passage in the air conditioning case 10 includes a front seat cold air passage P1, a hot air passage P2, and a rear seat cold air passage P3.

The evaporator 20 is a cooling heat exchanger to cool air passing through the evaporator 20. The heater core 30 is a heating heat exchanger to heat air passing through the evaporator 20. The heater core 30 is arranged at the hot air passage P2 which is located at a downstream side of the evaporator 20 in an air flow direction. An electric heater 40, such as a PTC heater, may be disposed in the hot air passage P2. The front seat temperature door 51 is arranged between the evaporator 20 and the heater core 30 in order to adjust an opening degree of the hot air passage P2 passing through the heater core 30 and opening degrees of the cold air passages P1 and P3 bypassing the heater core 30. The front seat mode door is composed of a defrost door 53, a vent door 54, and a floor door 55.

A rear seat air passage is composed of the rear seat cold air passage P3 that the air passing the evaporator 20 bypasses the heater core 30, and the hot air passage that the air passes the heater core 30. The hot air passage of the rear seat air passage is the hot air passage P2 of a front seat air passage. That is, some of the air flowing in the hot air passage P2 after passing the heater core 30 moves up, and then, is discharged to at least one among the defrost vent 12, the front seat face vent 13, and the floor vent 114. The rest of the air moves down, and then, is discharged to at least one among the rear seat face vent 15 and the rear seat floor vent 16. A rear seat mode door 58 for adjusting an opening degree of the rear seat face vent 15 and an opening degree of the rear seat floor vent 16 is disposed in the rear seat air passage.

In the air conditioning case 10, a rear seat temperature door 52, an auxiliary rear seat temperature door 56, and a rear seat on-off door 57 are disposed. The rear seat temperature door 52 is disposed between the evaporator 20 and the heater core 30 in order to adjust an opening degree of a passage connected to the hot air passage P2 and a passage connected to the rear seat cold air passage P3, and the auxiliary rear seat temperature door 56 is arranged at the downstream side of the heater core 30 in the air flow direction in order to adjust an opening degree of a passage connected to a rear seat air outlet. The rear seat on-off door 57 adjusts an opening degree of the rear seat cold air passage P3.

FIG. 2 is a view illustrating a front seat and rear seat cooling mode of the conventional air conditioner for a vehicle. Referring to FIG. 2, in the front seat and rear seat cooling mode, the front seat temperature door 51 closes the hot air passage P2 and opens the front seat cold air passage P1, and the rear seat temperature door 52 closes the hot air passage P2 and opens the rear seat cold air passage P3. The auxiliary rear seat temperature door 56 closes the passage connected to the rear seat air outlet, and the rear seat on-off door 57 opens the rear seat cold air passage P3. The air cooled while passing the evaporator 20 bypasses the heater core 30, and then, some of the air is discharged to at least one among front seat air outlets, and the rest of the air is discharged to at least one among rear seat air outlets after passing through the rear seat cold air passage P3.

FIG. 3 illustrates a front seat and rear seat heating mode of the conventional air conditioner for a vehicle. Referring to FIG. 3, in the front seat and rear seat heating mode, the front seat temperature door 51 closes the front seat cold air passage P1 and opens the hot air passage P2, and the rear seat temperature door 52 closes the rear seat cold air passage P3 and opens the hot air passage P2. The auxiliary rear seat temperature door 56 opens the passage connected to the rear seat air outlet, and the rear seat on-off door 57 closes the rear seat cold air passage P3. The air passing the evaporator 20 is heated while passing the heater core 30, and then, some of the air moves up and is discharged to at least one among the front seat air outlets, and the rest of the air moves down and is discharged to at least one among the rear seat air outlets.

The conventional air conditioner controls air-conditioning on/off states according to locations of the rear seat temperature door 52 and the rear seat on-off door 57, and the rear seat mode door 58 is used only for adjustment of rear seat modes. Such conventional air conditioner for a vehicle has a disadvantage in that the number of components is increased since the conventional air conditioner must include two temperature doors 52 and 56, one on-off door 57, and one mode door 58 in order to perform a control of air conditioning of the rear seat.

Moreover, the conventional air conditioner has other disadvantages in that the size of the air conditioner is increased if the hot air passage gets longer since the air conditioner has a plurality of heat exchangers, in that there may be an interference between the heat exchangers and the doors, and in that resistance is inevitably generated when the temperature door is located at a temperature adjusting area where cold air and hot air are mixed and hinders the flow of air.

DISCLOSURE

Technical Problem

Accordingly, the present invention has been made in an effort to solve the above-mentioned problems occurring in the prior arts, and it is an object of the present invention to provide an air conditioner for a vehicle which does not deteriorate air-conditioning performance, can realize various air conditioning modes, and optimizes control of doors according to the modes while reducing the number of doors.

It is another object of the present invention to provide an air conditioner for a vehicle which does not increase the size of the air conditioner even though a hot air passage gets longer due to a plurality of heat exchangers mounted, prevents interference between the heat exchangers and the doors, and does not hinder the flow of air when a temperature door is located at a temperature adjusting area where cold air and hot air are mixed.

Technical Solution

To achieve the above objects, the present invention provides an air conditioner for a vehicle, which includes an air conditioning case 110 having an air passage formed therein, and a cooling heat exchanger and a heating heat exchanger which are disposed in the air passage of the air conditioning case to exchange heat with air passing through the air passage, including: a front seat temperature door which adjusts an opening degree between a front seat cold air passage and a part of a hot air passage; a first rear seat temperature door which is arranged between the cooling heat exchanger and the heating heat exchanger to adjust an opening degree of the other part of the hot air passage; and a second rear seat temperature door which is arranged at the downstream side of the heating heat exchanger and adjusts an opening degree between the hot air passage and a rear seat cold air passage, wherein the second rear seat temperature door includes an asymmetric dome.

Moreover, the second rear seat temperature door has a radius of the hot air passage which is shorter than a radius of the cold air passage.

Furthermore, the dome of the second rear seat temperature door has two surfaces having different curvatures.

Additionally, the second rear seat temperature door has a first curvature surface which serves to uniformly keep a gap between the second rear seat temperature door and a partition wall of the air conditioning case.

In addition, the second rear seat temperature door has a second curvature surface which serves to induce a smooth movement of air and to prevent interference between the second rear seat temperature door and the partition wall of the air conditioning case when the second rear seat temperature door is rotated in a maximum cooling mode.

Moreover, the partition wall of the air conditioning case partitions the hot air passage from the rear seat cold air passage.

Furthermore, the second rear seat temperature door includes: a first curvature surface which abuts a hot air passage radial face and forms a convex curvature based on a door shaft; and a second curvature surface which abuts a cold air passage radial face and forms a concave curvature based on a door shaft.

Additionally, the second rear seat temperature door has a straight section which is formed on at least a part of the curvature surface abutting the hot air passage radial face.

In addition, the first curvature surface and the second curvature surface form an inverted curve based on an inflection point between the first curvature surface and the second curvature surface.

Moreover, the second rear seat temperature door includes a plurality of rigid reinforcing ribs which are arranged in the dome thereof, extend in a straight line at right angles to the door shaft, and spaced apart from one another in an axial direction of the door shaft.

Furthermore, a plurality of the heating heat exchangers are disposed.

Additionally, the heating heat exchangers includes a heater core and an electric heater disposed downstream of the heater core, and the second rear seat temperature door is disposed adjacent to a lower end of the electric heater.

In addition, the air conditioner for a vehicle further includes a rear seat mode door which is arranged at the downstream side of the second rear seat temperature door to adjust an opening degree of a rear seat air outlet, wherein the air conditioner performs temperature control of the rear seat using the first rear seat temperature door and the second rear seat temperature door and controls opening and closing (on-off mode) of the rear seat air passage using the rear seat mode door.

Moreover, the hot air passage and the rear seat cold air passage located at the downstream side of the heating heat exchanger communicate with each other, and the second rear seat temperature door adjusts an opening degree between the rear seat cold air passage and a communication passage between the hot air passage and the rear seat cold air passage located at the downstream side of the heating heat exchanger.

Furthermore, in a maximum cooling mode, the second rear seat temperature door closes the communication passage between the hot air passage and the rear seat cold air passage located at the downstream side of the heating heat exchanger, and, in a maximum heating mode, the second rear seat temperature door closes the rear seat cold air passage. Additionally, in a mixing mode, the second rear seat temperature door is located between the rear seat cold air passage and the communication passage between the hot air passage and the rear seat cold air passage located at the downstream side of the heating heat exchanger.

Advantageous Effects

The air conditioner for a vehicle according to an embodiment of the present invention can realize a three-zone air conditioner which can smoothly perform control of rear seat air-conditioning while reducing the number of doors using two temperature doors and one mode door. Therefore, the air conditioner for a vehicle can reduce manufacturing costs and also decrease load and volume of the air conditioner by reducing the number of components.

Furthermore, the air conditioner for a vehicle which does not increase the size of the air conditioner to make a compact size of the air conditioner possible even though a hot air passage gets longer due to a plurality of heat exchangers mounted, prevents interference between the heat exchangers and the doors to facilitate a smooth operation of the doors, and does not hinder the flow of air when a temperature door is located at a temperature adjusting area where cold air and hot air are mixed.

MODE FOR INVENTION

Hereinafter, a technical structure of an air conditioner for a vehicle according to a preferred embodiment of the present invention will now be described in detail with reference to the attached drawings.

Figure 1:
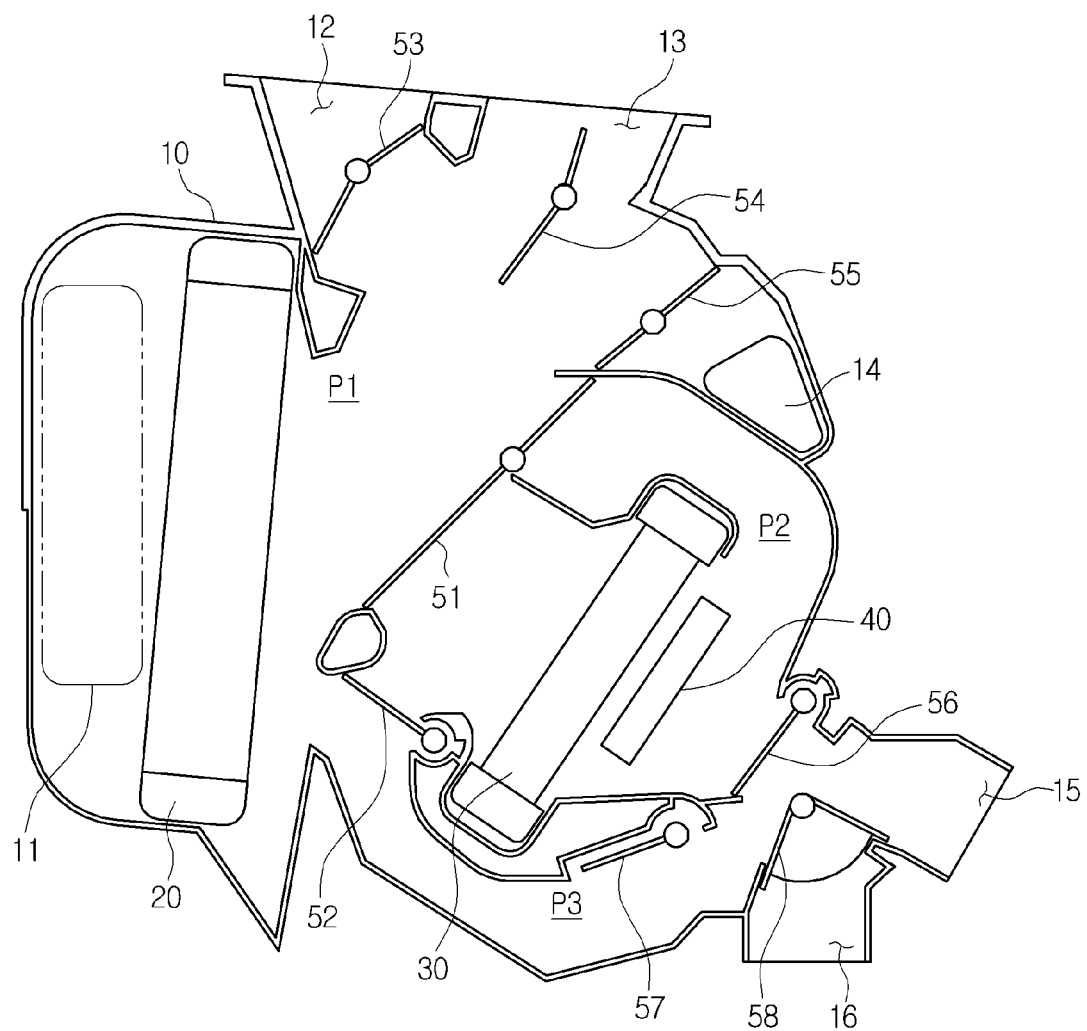
FIG. 1 is a sectional view illustrating a conventional air conditioner for a vehicle.
Figure 2:
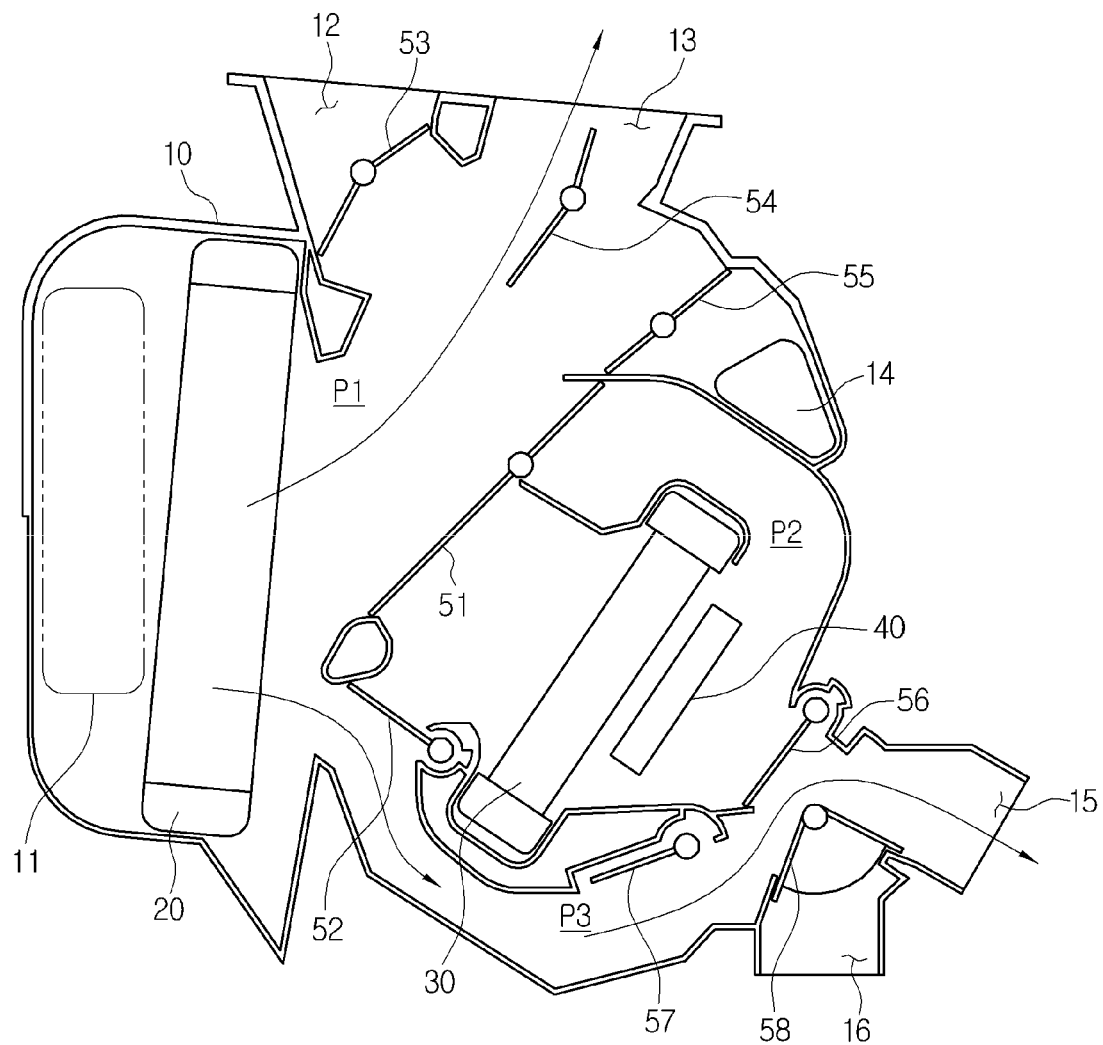
FIG. 2 is a view illustrating a front seat and rear seat cooling mode of the conventional air conditioner for a vehicle.
Figure 3:
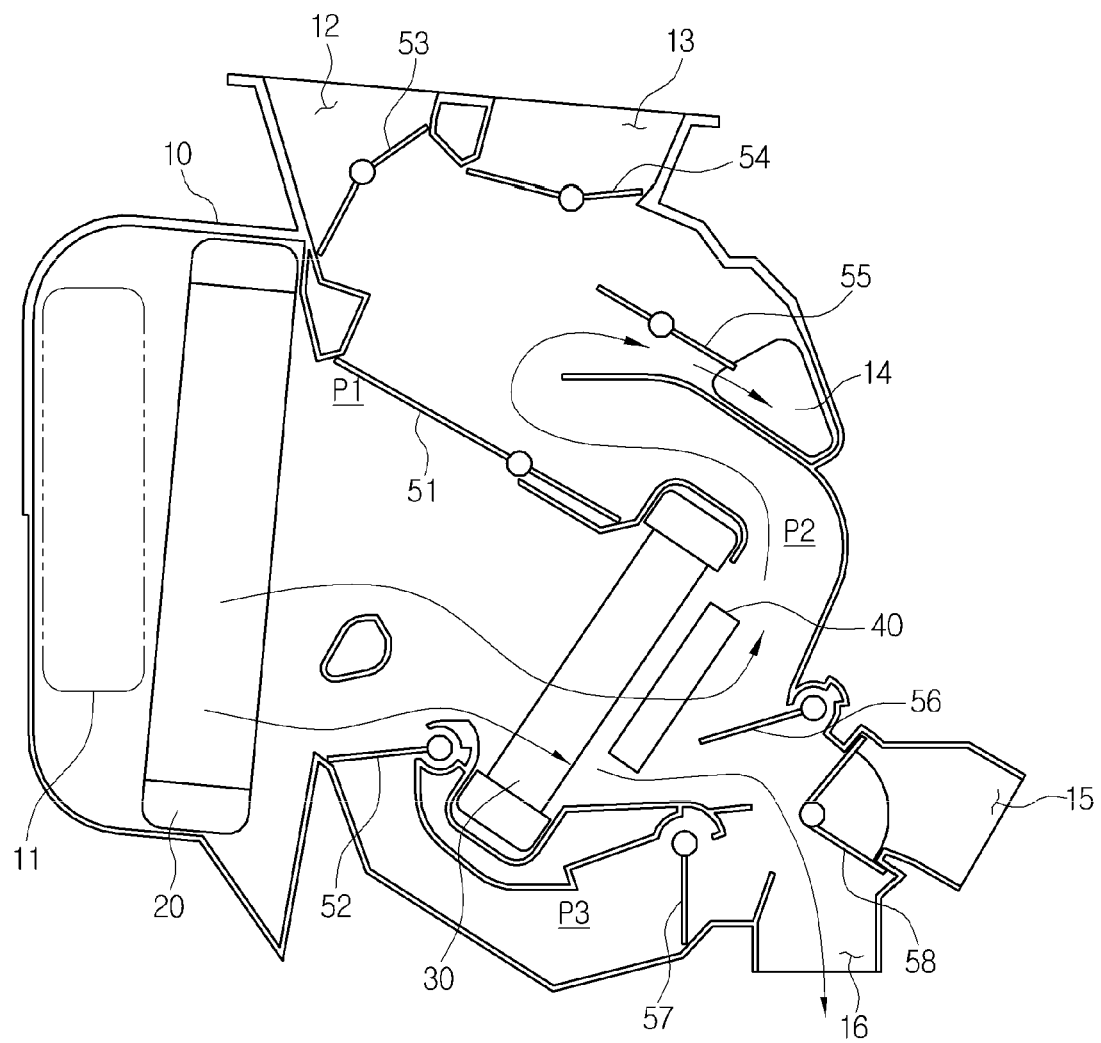
FIG. 3 is a view illustrating a front seat and rear seat heating mode of the conventional air conditioner for a vehicle.
Figure 4:
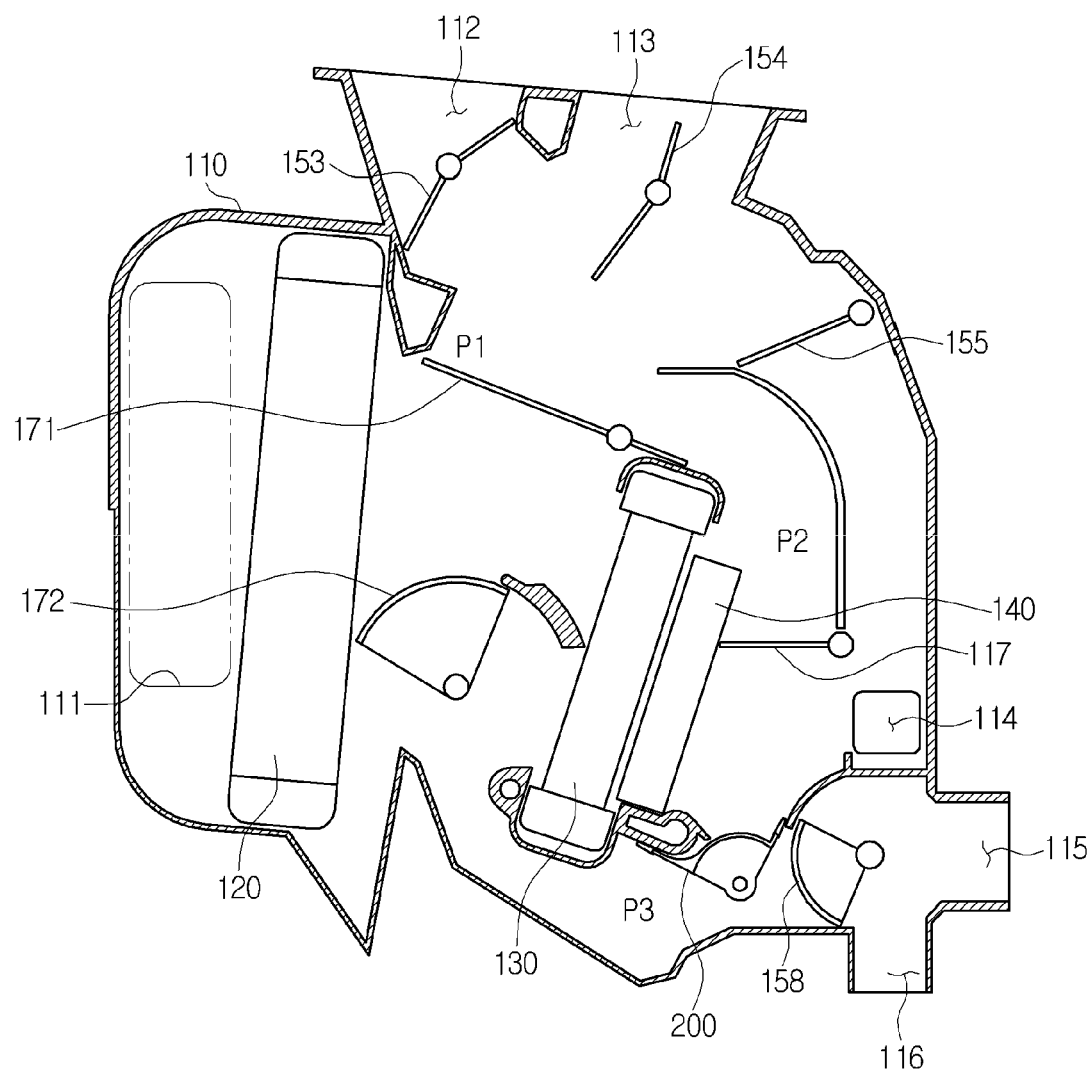
FIG. 4 is a sectional view illustrating an air conditioner for a vehicle according to a preferred embodiment of the present invention.

FIG. 4 is a sectional view illustrating an air conditioner for a vehicle according to a preferred embodiment of the present invention. As illustrated in FIG. 4, the air conditioner for a vehicle according to the preferred embodiment of the present invention includes an air conditioning case 110 having an air passage formed therein, a cooling heat exchanger and a heating heat exchanger which are disposed in the air passage of the air conditioning case 110 to exchange heat with air passing through the air passage.

The air conditioning case 110 includes an air inlet 111, air outlets, and an air passage formed therein. An air blower is connected to the air inlet 111 so that indoor air or outdoor air is selectively induced into the air passage formed in the air conditioning case 110. The air outlets include a front seat air outlet composed of a defrost vent 112, a front seat face vent 113, and a front seat floor vent 114, and a rear seat air outlet composed of a console vent 115 and a rear seat floor vent 116.

The cooling heat exchanger is an evaporator 120. Refrigerant flowing in the evaporator 120 and air passing through the evaporator 120 exchange heat with each other so that the air is cooled. The heating heat exchanger is a heater core 130. Cooling water flowing in the heater core 130 and air passing through the heater core 130 exchange heat with each other so that the air is heated. The heater core 130 is arranged in a hot air passage P2 which is located at the downstream side of the evaporator 120 in an air flow direction. An electric heater 140, such as a PTC heater, may be further disposed at the downstream side of the heater core 130.

The air passage formed in the air conditioning case 110 includes a front seat cold air passage P1, the hot air passage P2, and a rear seat cold air passage P3. The air passage at the downstream side of the evaporator 120 is composed of the front seat cold air passage P1, the hot air passage P2, and the rear seat cold air passage P3. The front seat cold air passage P1, the hot air passage P2, and the rear seat cold air passage P3 are arranged in sequence from top to bottom, and the hot air passage P2 is arranged between the front seat cold air passage P1 and the rear seat cold air passage P3 in a vertical direction.

The air passing through the evaporator 120 bypasses the heater core 130 of the hot air passage P2 and is discharged to the interior through the front seat cold air passage P1 and the rear seat cold air passage P3, or is discharged to the interior through the hot air passage P2 after passing through the evaporator 120. Alternatively, the air passing through the heater core 130 of the hot air passage P2 is mixed with the air passing through the front seat cold air passage P1 or the rear seat cold air passage P3, and then, is discharged to the interior.

The front seat cold air passage P1 is a passage that the air passing through the evaporator 120 bypasses the heater core 130 and flows toward the front seat of the vehicle. The rear seat cold air passage P3 is a passage that the air passing through the evaporator 120 bypasses the heater core 130 and flows toward the rear seat of the vehicle. The hot air passage P2 is a passage that the air passing through the evaporator 120 passes through the heater core 130 and flows toward the front seat or the rear seat of the vehicle.

The air conditioning case 110 includes the front seat air outlet for discharging air toward the front seat of the vehicle, and an opening degree of the front seat air outlet is controlled by a front seat mode door. The front seat mode door is composed of a defrost door 153 for adjusting an opening degree of the defrost vent 112, a vent door 154 for adjusting an opening degree of the front seat face vent 113, and a floor door 155 for adjusting an opening degree of the front seat floor vent 114. Additionally, the air conditioning case 110 further includes the rear seat air outlet for discharging air toward the rear seat of the vehicle, and an opening degree of the rear seat air outlet is controlled by a rear seat mode door 158.

The air conditioner for a vehicle includes a front seat temperature door 171. The front seat temperature door 171 adjusts an opening degree between the front seat cold air passage P1 and some of the hot air passage P2. The front seat temperature door 171 is located at a downstream area adjacent to the evaporator 120, namely, at a boundary area where the front seat cold air passage P1 and the hot air passage P2 are divided from each other. The front seat temperature door 171 is formed in a tail door type which has plate members formed at both sides based on a rotary shaft, namely, a driving shaft.

In other words, the front seat temperature door 171 includes a rotary shaft, a first door part, and a second door part. The rotary shaft of the front seat temperature door 171 is mounted adjacent to the bottom end of an exit of the hot air passage P2. The first door part is formed at one side based on the rotary shaft in order to adjust an opening degree of a part of an upper portion among an entrance of the cold air passage P1 and an entrance of the hot air passage P2. The second door part is formed at the other side based on the rotary shaft in order to adjust an opening degree of the exit of the hot air passage P2 toward the front seat side.

Meanwhile, the air conditioning case 110 may further include a hot air bypass passage and a hot air bypass door 117. The hot air bypass passage and the hot air bypass door 117 are formed at a wall member which partitions the hot air passage P2 from the passage facing the front seat floor vent 114. The hot air bypass door 117 opens and closes the hot air bypass passage. When the hot air bypass door 117 opens the hot air bypass passage, hot air passing through the heater core 130 and the electric heat 140 is discharged to the interior of the vehicle through the front seat floor vent 114 after passing through the hot air bypass passage.

The air conditioner for a vehicle according to the preferred embodiment of the present invention is configured to perform the temperature control of independent three zones including a driver's seat of the front side, a passenger's seat of the front side, and a rear seat, and has three doors for controlling temperature of the rear seat. That is, the air conditioner includes a first rear seat temperature door 172, a second rear seat temperature door 200, and a rear seat mode door 158.

The first rear seat temperature door 172 is arranged between the evaporator 120 and the heater core 130 in order to adjust an opening degree of the other part of the hot air passage P2. That is, the first rear seat temperature door 172 adjusts the opening degree of some part of the entrance of the hot air passage P2 which is not covered by the front seat temperature door 171.

Figure 5:
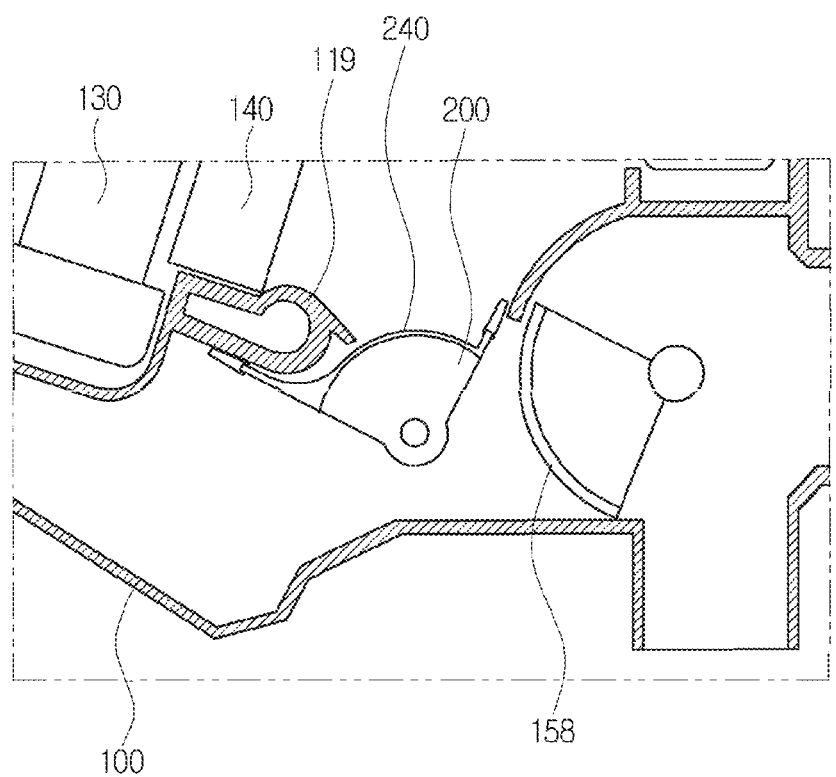
FIG. 5 is a partially enlarged sectional view of the air conditioner for a vehicle of FIG. 4.
Figure 6:
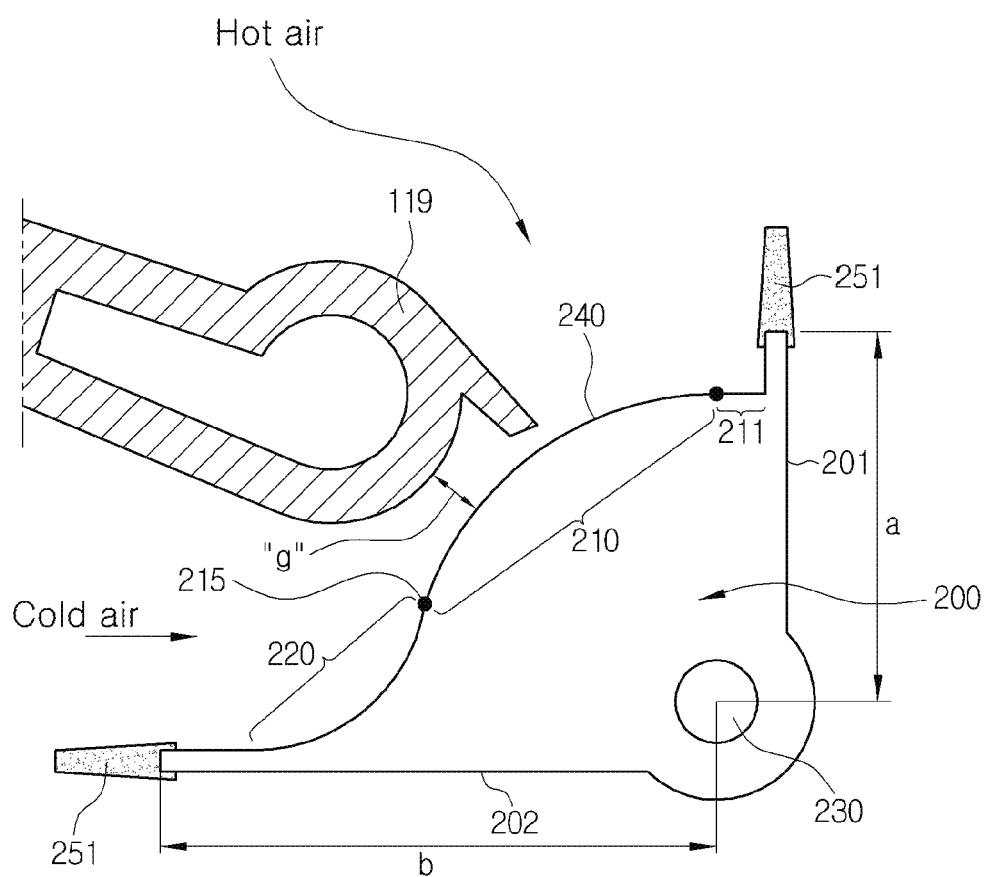
FIG. 6 is an enlarged view of a second rear seat temperature door according to the preferred embodiment of the present invention.
Figure 7:
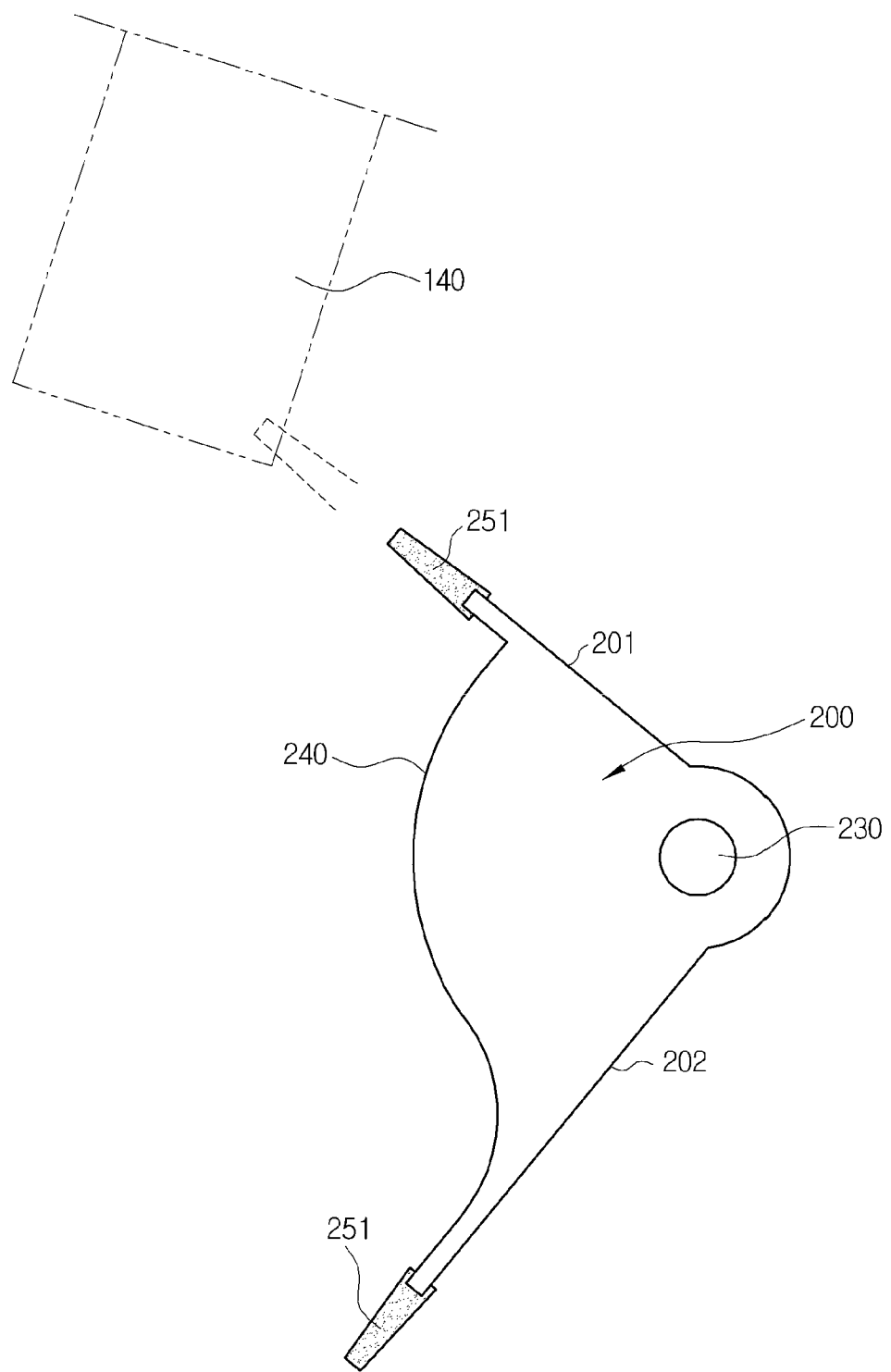
FIGS. 7 and 8 are views illustrating an operational example of FIG. 6.
Figure 8:
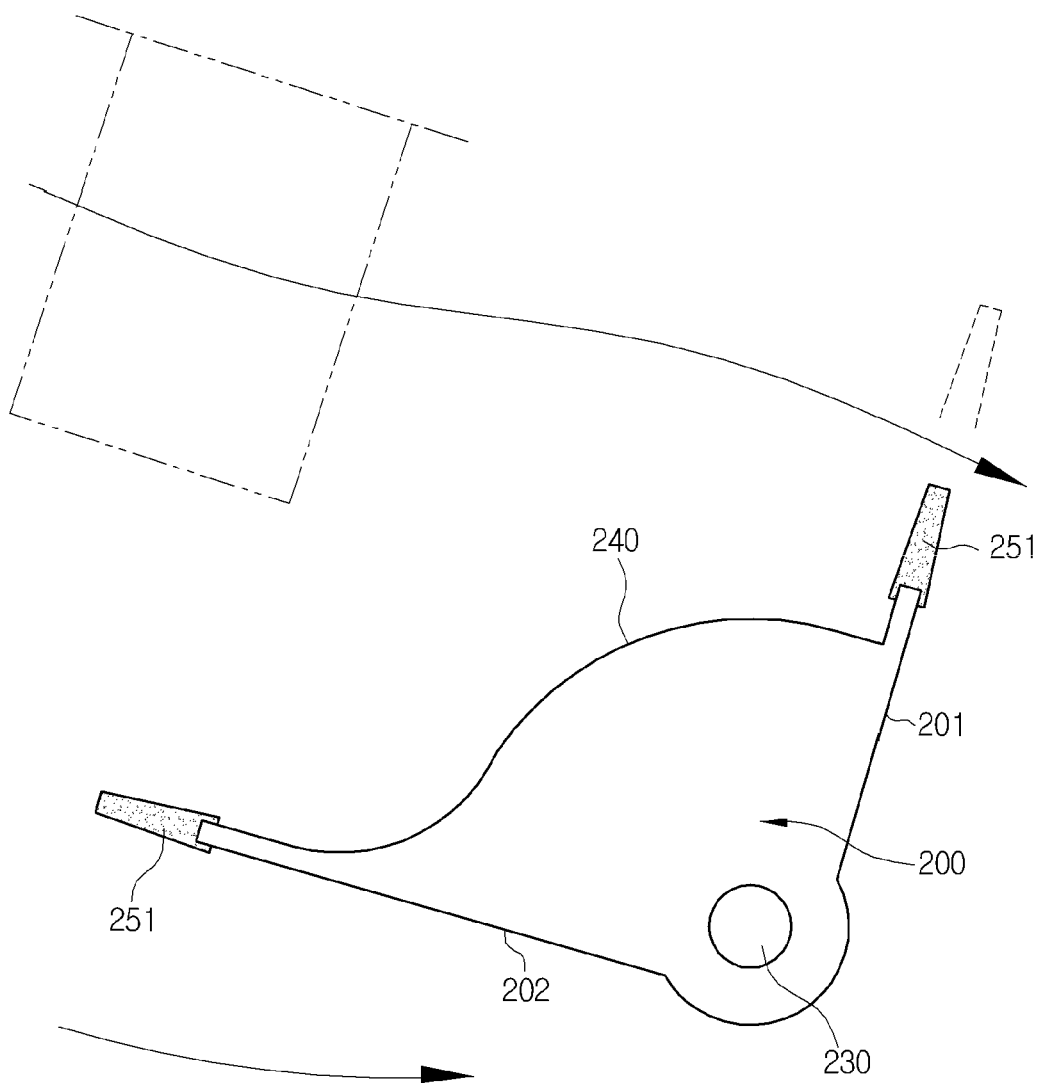
Figure 9:
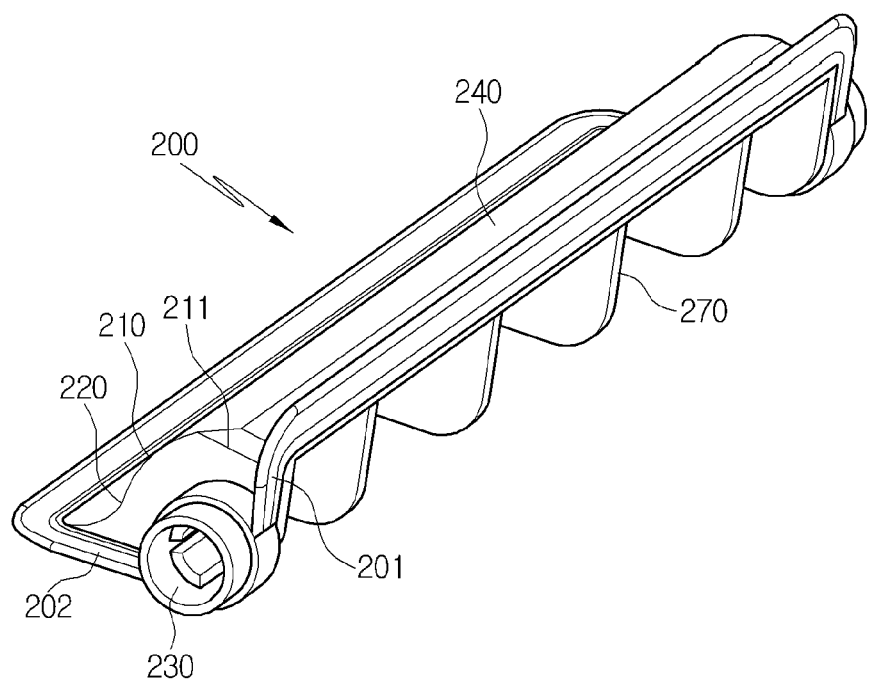
FIG. 9 is a perspective view illustrating the second rear seat temperature door according to the preferred embodiment of the present invention.

FIG. 5 is a partially enlarged sectional view of the air conditioner for a vehicle of FIG. 4, FIG. 6 is an enlarged view of the second rear seat temperature door according to the preferred embodiment of the present invention, FIGS. 7 and 8 are views illustrating an operational example of FIG. 6, and FIG. 9 is a perspective view illustrating the second rear seat temperature door according to the preferred embodiment of the present invention.

Referring to FIGS. 5 to 9, the second rear seat temperature door 200 is arranged at the downstream side of the heater core 130 in order to adjust an opening degree between the hot air passage P2 and the rear seat cold air passage P3. The second rear seat temperature door 200 is a dome-like door having a dome 240. The hot air passage P2 and the rear seat cold air passage P3 which are located at the downstream side of the heater core 130 are configured to communicate with each other. The second rear seat temperature door 200 is arranged in a communication passage between hot air passage P2 and the rear seat cold air passage P3 located at the downstream side of the heater core 130. That is, the second rear seat temperature door 200 adjusts an opening degree of the rear seat cold air passage P3 and an opening degree of the communication passage between hot air passage P2 and the rear seat cold air passage P3.

The rear seat mode door 158 is arranged at the downstream side of the second rear seat temperature door 200 in order to adjust an opening degree of the rear seat air outlet. The rear seat mode door 158 is a dome-like door. The rear seat mode door 158 adjusts opening degrees of the rear seat air passage, the console vent 115, and the rear seat floor vent 116.

That is, the rear seat mode door 158 closes the rear seat air passage by maximizing a counterclockwise rotation in FIG. 4, closes the rear sat floor vent 116 and opens the console vent 115 by rotating at a predetermined angle in the clockwise direction, closes the console vent 115 and opens the rear seat floor vent 116 by maximizing a clockwise rotation, or opens the two vent modes by being located halfway between the console vent 115 and the rear seat floor vent 116.

The air conditioner performs temperature control of the rear seat using the first rear seat temperature door 172 and the second rear seat temperature door 200. Moreover, the air conditioner controls an on-off mode of the rear seat air passage using the rear seat mode door 158. As described above, the air conditioner for a vehicle according to the preferred embodiment of the present invention can realize a three-zone air conditioner since reducing the number of doors in comparison with the conventional air conditioner and smoothly performing the air-conditioning control of the rear seat using the two temperature doors and one mode door. Therefore, the air conditioner for a vehicle according to the preferred embodiment of the present invention can reduce manufacturing costs and decrease load and volume of the air conditioner by reducing the number of components.

In case that the rear seat mode door 158 closes the rear seat air passage, the location of the first rear seat temperature door 172 is varied depending on conditions of the front seat. In detail, when the rear seat mode door 158 closes the rear seat air passage, if the front seat temperature door 171 is located in a maximum cooling mode of the front seat, the first rear seat temperature door 172 is located in the maximum cooling mode of the rear seat.

Furthermore, when the rear seat mode door 158 closes the rear seat air passage, if the front seat temperature door 171 is not in the maximum cooling mode of the front seat, the first rear seat temperature door 172 is located in the maximum heating mode of the rear seat. In this instance, if the front seat temperature door 171 is not in the maximum cooling mode of the front seat, the front seat temperature door 171 may be in a maximum heating mode or in a mixing mode.

As described above, because the location of the first rear seat temperature door 172 is varied depending on the front seat conditions, the air conditioner according to the preferred embodiment of the present invention can make the most of performance of the heater core 130 at the front seat by guiding all of the air to flow toward the hot air passage P2 in order to enhance heating performance.

The first rear seat temperature door 172 is a dome-like door. The first rear seat temperature door 172 is located to close the hot air passage P2 in the maximum cooling mode, and is located to partition the evaporator 120 from the heater core 130 in the maximum heating mode.

That is, the first rear seat temperature door 172 is configured to guide the air toward the hot air passage P2 by the dome-like inside if the front seat temperature door 171 is not in the maximum cooling mode of the front seat. Through the above configuration, the streamlined dome-like inside can smoothly guide the air passing through the evaporator 120 toward the heater core 130 of the hot air passage P2.

The first rear seat temperature door 172 is configured to always open the rear seat cold air passage P3. That is, the first rear seat temperature door 172 does not perform the on-off function of the rear seat cold air passage P3 but performs an opening and closing function of the hot air passage P2 and an air guiding function as described above so as to enhance performance of the heater core. Additionally, the on-off function of the rear seat cold air passage P3 is performed by the rear seat mode door 158, so that the air conditioner can reduce the number of the doors and smoothly perform the on-off control in the rear seat air-conditioning.

Meanwhile, the air conditioner for a vehicle according to the preferred embodiment of the present invention can control of rear seat temperature by adjusting the first rear seat temperature door 172 and the second rear seat temperature door 158. That is, in the maximum cooling mode, the first rear seat temperature door 172 closes the hot air passage P2, and the second rear seat temperature door 200 is located to close the communication passage between the hot air passage P2 and the rear seat cold air passage P3 at the downstream side of the heater core 130. Moreover, in the maximum heating mode, the dome-like inside of the first rear seat temperature door 172 is located to guide the air toward the hot air passage P2, and the second rear seat temperature door 200 is located to close the rear seat cold air passage P3. Furthermore, in the mixing mode, the dome-like inside of the first rear seat temperature door 172 is located to guide the air toward the hot air passage P2, and the second rear seat temperature door 200 is located between the rear seat cold air passage P3 and the communication passage formed between the hot air passage P2 and the rear seat cold air passage P3 at the downstream side of the heater core 130.

The dome 240 of the second rear seat temperature door 200 is formed to be asymmetric. That is, the second rear seat temperature door 200 has a radius (a) shorter than a radius (b) of the cold air passage. The second rear seat temperature door 200 is arranged adjacent to the bottom end of the electric heater 140. The radius (b) of the cold air passage is a length of a radial face 202 of the cold air passage, which is a face corresponding to the rear seat cold air passage P3, and is a distance from the center of a door shaft 230 to an end portion of the door. The radius (a) of the hot air passage is a length of a radial face 201 of the hot air passage, which is a face corresponding to the hot air passage P2, and is a distance from the center of the door shaft 230 to the other end portion of the door.

As described above, if the heater core 130 and the electric heater 140 are arranged side by side and a plurality of the heating heat exchangers are arranged, the hot air passage P2 inevitably becomes longer due to a space where the heater core 130 and the electric heater 140 occupy. So, a compact-sized air conditioner package cannot be implemented if the hot air passage P2 becomes longer. Because reduction in thickness of the heater core 130 and the electric heater 140 causes deterioration in air-conditioning performance, an operational range of the second rear seat temperature door 200 is reduced in order to implement the compact-sized air conditioner package.

Moreover, since the radius (a) of the hot air passage is shorter than the radius (b) of the cold air passage, there is no interference between the operational trace of the second rear seat temperature door 200 and the electric heater 140. Referring FIG. 7, if the radial face 201 of the hot air passage is long as indicated by the dotted line, there is an interference between the second rear seat temperature door 200 and the electric heater 140 when the second rear seat temperature door 200 rotates. However, in the preferred embodiment of the present invention, since the radial face 201 of the hot air passage is short, there is no interference between the second rear seat temperature door 200 and the electric heater 140 when the second rear seat temperature door 200 rotates.

Furthermore, since the radius (a) of the hot air passage is shorter than the radius (b) of the cold air passage, the second rear seat temperature door 200 prevents a decrease of air volume as the second rear seat temperature door 200 does not hinder the air flowing in the hot air passage P2 when the second rear seat temperature door 200 is in the temperature adjusting area (in the mixing mode or in the bi-level mode). Referring to FIG. 8, if the radial face 201 of the hot air passage is long as indicated by the dotted line, the second rear seat temperature door stops hot air passing through the electric heater 140 and it causes an increase of resistance and a decrease of air volume. However, in the preferred embodiment of the present invention, since the radial face 201 of the hot air passage is short, the second rear seat temperature door 200 does not hinder the flow of the air passing through the electric heater 140 so as to increase air volume.

Hereinafter, referring to FIG. 6, the configuration of the second rear seat temperature door will be described in more detail.

The dome 240 of the second rear seat temperature door 200 has a face having two different curvatures. Meanwhile, the air conditioning case 110 includes a partition wall 119. The partition wall 119 extends approximately horizontally toward the rear of the vehicle from the bottom ends of the heater core 130 and the electric heater 140, and partitions the hot air passage P2 from the rear seat cold air passage P3. The partition wall 119 has screw holes for assembling right and left air conditioning cases. That is, the second rear seat temperature door 200 has a first curvature surface 210 and a second curvature surface 220.

The first curvature surface 210 is formed adjacent to the hot air passage radial surface 201, and forms a convex curvature based on the door shaft 230. The first curvature surface 210 serves to uniformly keep a gap (g) between the dome and the partition wall 119 of the air conditioning case. That is, when the second rear seat temperature door 200 is operated, the first curvature surface 210 uniformly keeps the gap (g) between the partition wall 119 and the dome 240, so that a leak of cold air through the gap (g) is minimized and it is advantageous for temperature control of the rear seat. Especially, since the first curvature surface 210 uniformly keeps the gap (g) between the partition wall 119 and the dome 240 in the mixing mode where cold air and hot air are mixed, the rear seat temperature door 200 can show easy and accurate temperature control of the rear seat and minimize an effort of the second rear seat temperature door.

The second curvature surface 220 is formed adjacent to the cold air passage radial face 202, and forms a concave curvature based on the door shaft 230. The second curvature surface 220 induces a smooth movement of air and serves to prevent interference between the second rear seat temperature door 200 and the partition wall 119 of the air conditioning case in a condition that the second rear seat temperature door 200 is rotated in the maximum cooling mode. The partition wall 119 of the air conditioning case is rounded to make the flow of the air smooth. The second curvature surface 220 must not be interfered with the surface of the rounded partition wall 119 when the second rear seat temperature door 200 is rotated to the maximum in the clockwise direction, namely, when the second rear seat temperature door 200 is rotated in the maximum cooling mode.

The second curvature surface 220 forms a second curvature which is different from the curvature of the first curvature surface 210. That is, the first curvature surface 210 is a convex curvature extending based on the door shaft 230, but the second curvature surface 220 is a concave curvature extending based on the door shaft 230 from an inflection point 215. Rubber members 251 for seating the partition wall 119 are coupled to both sides of the second rear seat temperature door 200. As described above, the first curvature surface 210 and the second curvature surface 220 form an inverted curve based on the inflection point 215, and so, the dome 240 forms different continuous curvatures based on the inflection point 215. Therefore, the air conditioner for a vehicle according to the preferred embodiment of the present invention can actuate the door smoothly and design a compact-size of the air conditioner package.

Additionally, the dome 240 of the second rear seat temperature door 200 has a straight section 211. The straight section 211 may be formed on at least a part of the curvature surface abutting the hot air passage radial face 201. That is, the straight section 211 may be formed at a portion where the first curvature surface 210 and the hot air passage radial face 201 are connected with each other. The straight section 211 facilitates an easy removal of a mold frame when the second rear seat temperature door 200 is molded, and makes it easy that the hot air passage radial face 201 is formed shorter than the cold air passage radial face 202.

In addition, the second rear seat temperature door 200 includes a rigid reinforcing rib 270. The rigid reinforcing rib 270 is arranged in the dome 240 of the second rear seat temperature door 200, and extends in a straight line at right angles to the door shaft 230. A plurality of the rigid reinforcing ribs 270 are spaced apart from one another in an axial direction of the door shaft 230. The rigid reinforcing ribs 270 are arranged in the dome 240 not to hinder the flow of the air and to effectively reinforce intensity of the second rear seat temperature door 200 of the asymmetric dome shape.

Figure 10:
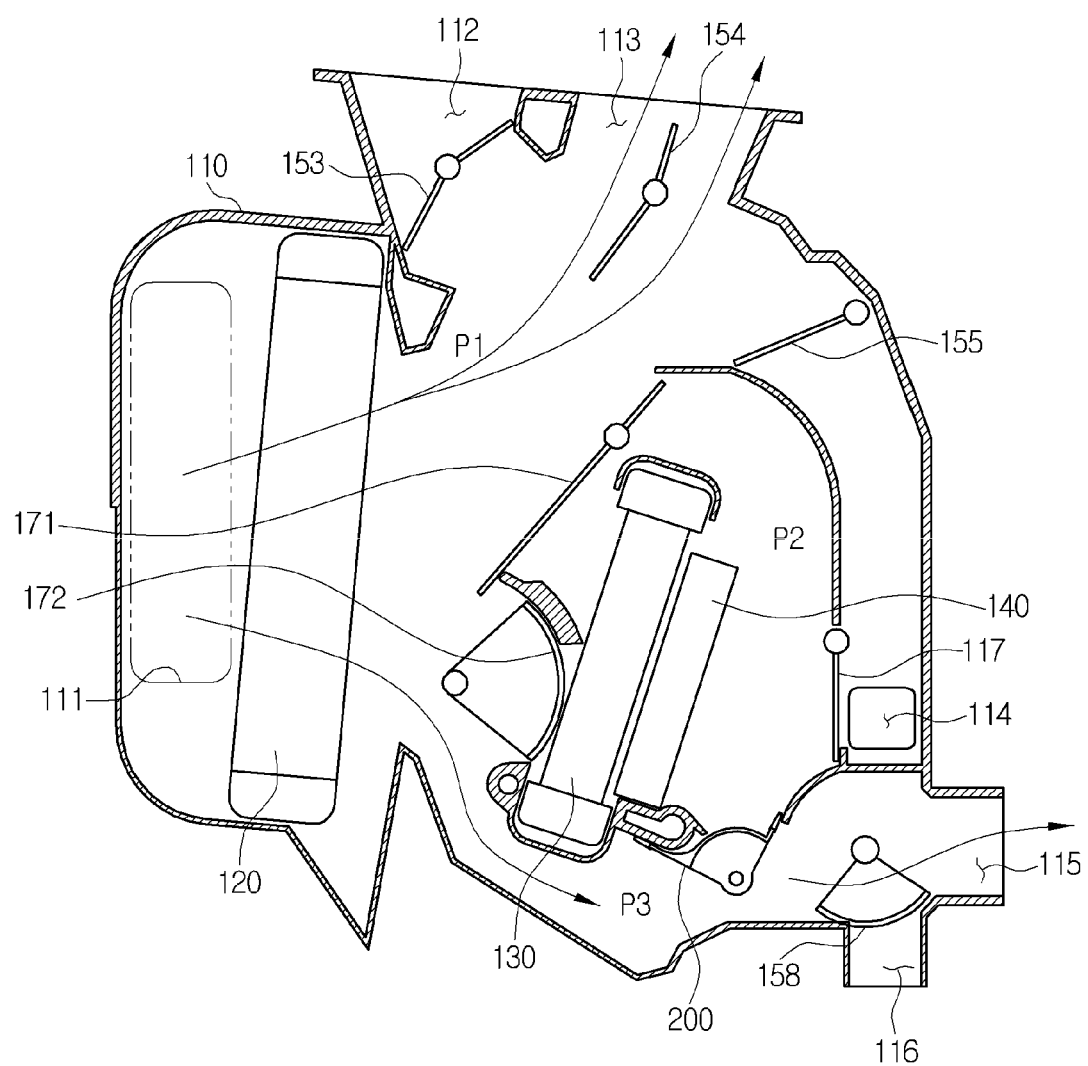
FIG. 10 is a view illustrating a rear seat vent mode of the air conditioner for a vehicle according to the preferred embodiment of the present invention.

FIG. 10 is a view illustrating a rear seat vent mode of the air conditioner for a vehicle according to the preferred embodiment of the present invention.

Referring to FIG. 10, some of the air passing through the evaporator 120 is discharged to the front seat face vent 113 through the front seat cold air passage P1 and the other is discharged to the console vent 115 through the rear seat cold air passage P3.

In this instance, the front seat temperature door 171 and the first rear seat temperature door 172 all close the hot air passage P2, and the second rear seat temperature 200 closes the communication passage between the hot air passage and the rear seat cold air passage. Moreover, the rear seat mode door 158 closes the rear seat floor vent 116 and opens the console vent 115.

Figure 11:
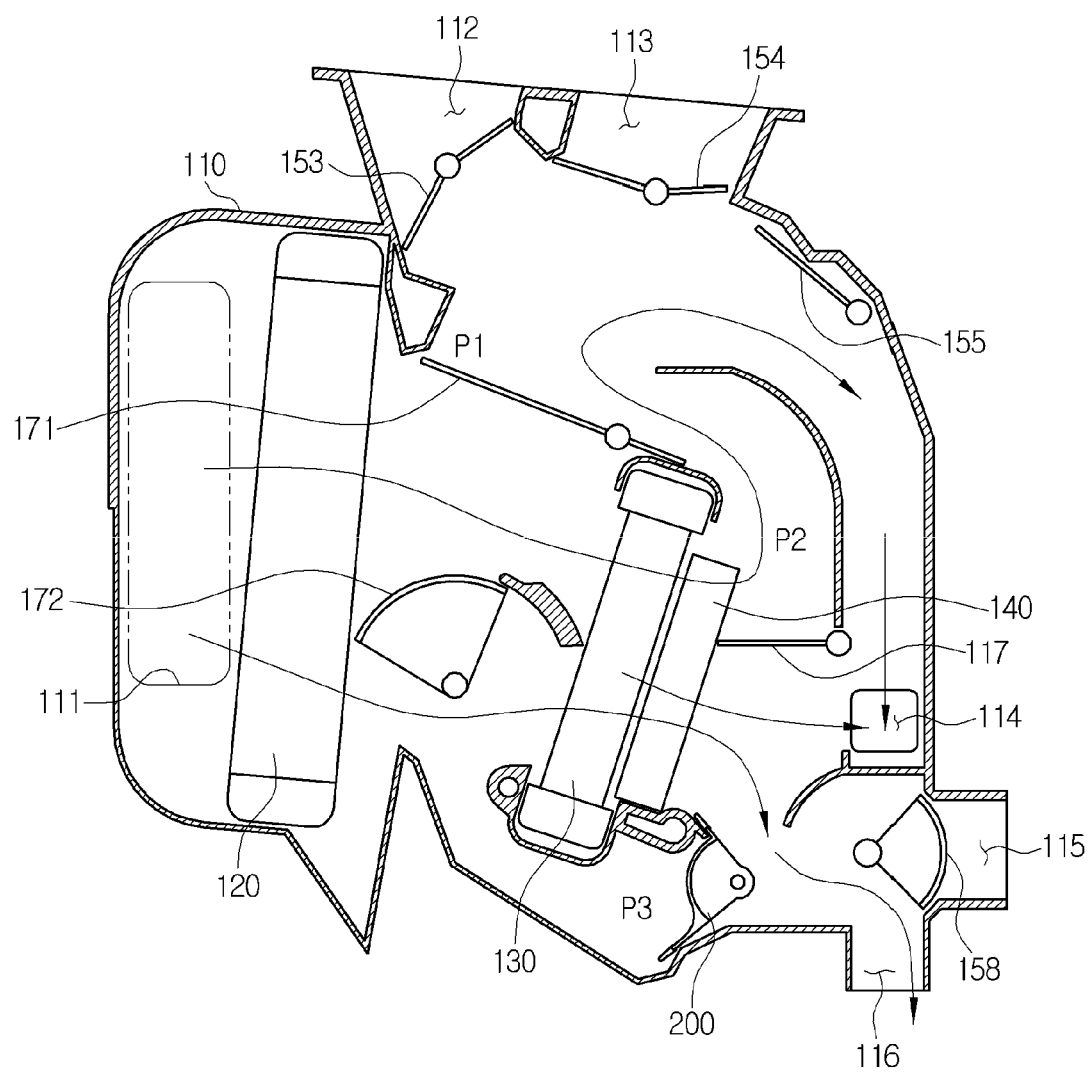
FIG. 11 is a view illustrating a rear seat floor mode of the air conditioner for a vehicle according to the preferred embodiment of the present invention.

FIG. 11 is a view illustrating a rear seat floor mode of the air conditioner for a vehicle according to the preferred embodiment of the present invention.

Referring to FIG. 11, all of the air passing through the evaporator 120 flows to the hot air passage P2, and passes through the heater core 130 and the electric heater 140. After that, some of the air is discharged to the front seat floor vent 114, and the other is discharged to the rear seat floor vent 116 through the communication passage between the hot air passage and the rear seat cold air passage.

In this instance, the front seat temperature door 171 and the first rear seat temperature door 172 all open the hot air passage P2, and the second rear seat temperature 200 opens the communication passage between the hot air passage and the rear seat cold air passage. Furthermore, the rear seat mode door 158 closes the console vent 115 and opens the rear seat floor vent 116. Additionally, the hot air bypass door 117 opens the hot air bypass passage, so that some of the air passing through the heater core 130 and the electric heater 140 is discharged to the front seat floor vent 114 through the hot air bypass passage.

Figure 12:
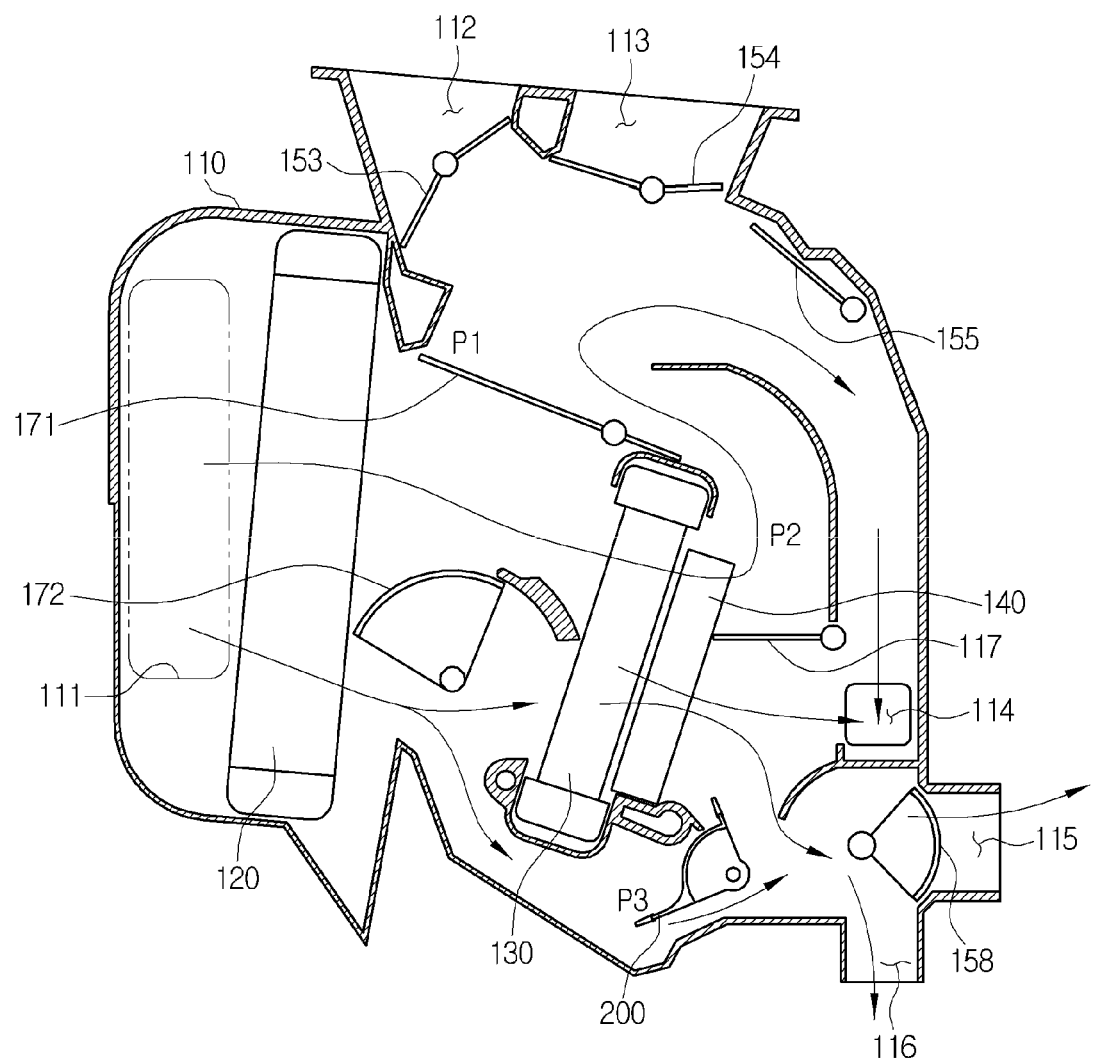
FIG. 12 is a view illustrating a rear seat bi-level mode of the air conditioner for a vehicle according to the preferred embodiment of the present invention.

FIG. 12 is a view illustrating a rear seat bi-level mode of the air conditioner for a vehicle according to the preferred embodiment of the present invention.

Referring to FIG. 12, the front seat floor mode may be performed relative to the front seat as illustrated in FIG. 11, or a bi-level mode may be performed relative to the front seat by the front seat face vent 113 partially opened. Some of the air passing through the evaporator 120 flows to the hot air passage P2, passes through the heater core 130 and the electric heater 140, and then, flows to the rear seat air passage after passing through the communication passage between the hot air passage and the rear seat cold air passage. The other of the air passing through the evaporator 120 passes through the rear seat cold air passage P3, and then, is mixed with the air heated while passing through the hot air passage P2. The mixed air is discharged to the console vent 115 and the rear seat floor vent 116.

In this instance, the first rear seat temperature door 172 opens the hot air passage P2, and the second rear seat temperature door 200 is located in the middle in order to open all of the rear seat cold air passage P3 and the communication passage between the hot air passage and the rear seat cold air passage to adjust temperature. Moreover, the rear seat mode door 158 is located in the middle between the console vent 115 and the rear seat floor vent 116 in order to implement the bi-level mode. Furthermore, the hot air bypass door 117 opens the hot air bypass passage, so that some of the air passing through the heater core 130 and the electric heater 140 can be directly discharged to the front seat floor vent 114 through the hot air bypass passage.

Figure 13:
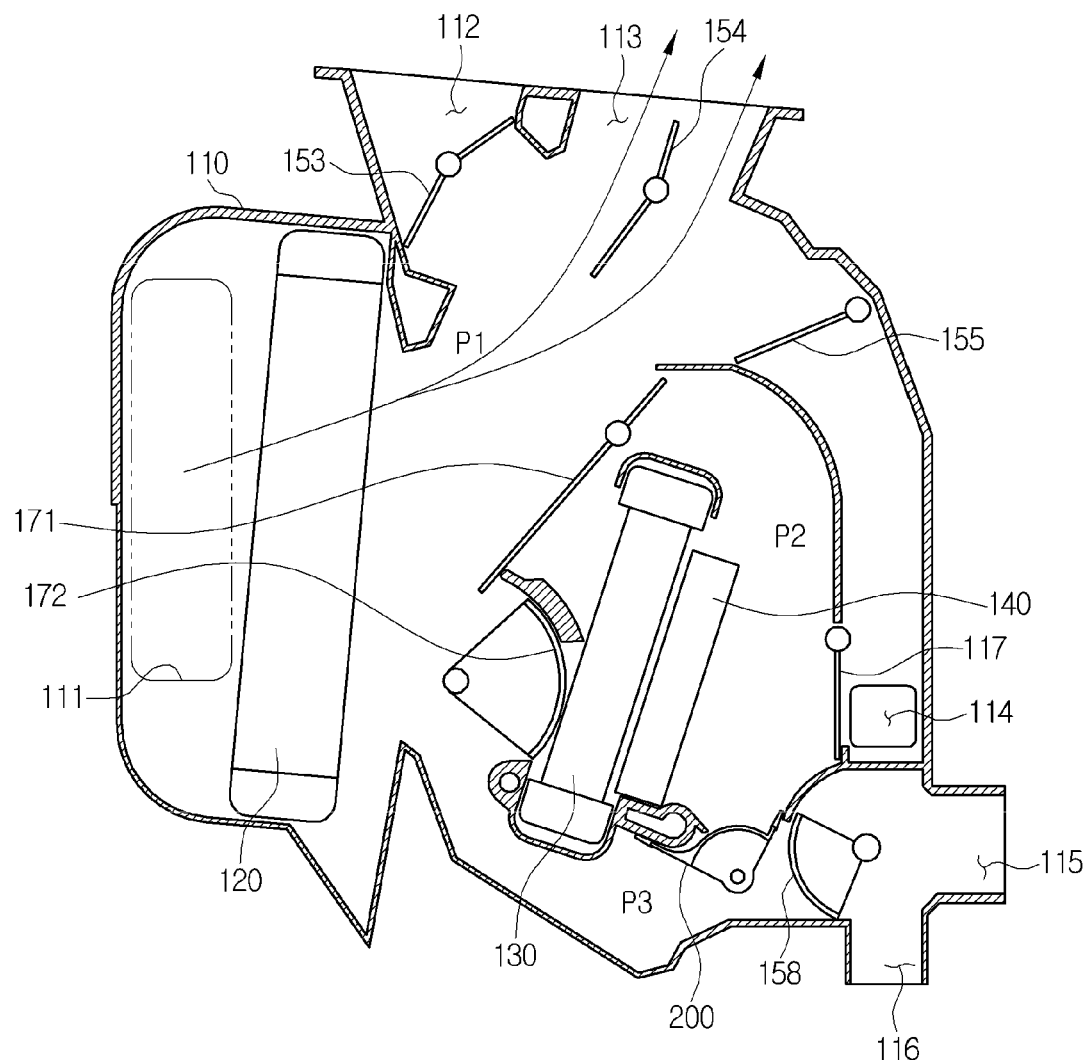
FIG. 13 is a view illustrating a front seat maximum cooling mode of the air conditioner for a vehicle according to the preferred embodiment of the present invention.

FIG. 13 is a view illustrating a front seat maximum cooling mode of the air conditioner for a vehicle according to the preferred embodiment of the present invention.

Referring to FIG. 13, all of the air passing through the evaporator 120 is discharged to the front seat face vent 113 through the front seat cold air passage P1. In this instance, the front seat temperature door 171 and the first rear seat temperature door 172 all close the hot air passage P2, and the second rear seat temperature door 200 closes the communication passage between the hot air passage and the rear seat cold air passage. Additionally, the rear seat mode door 158 closes the rear seat air passage so that all of the air passing through the evaporator 120 flows to the front seat cold air passage P1.

Figure 14:
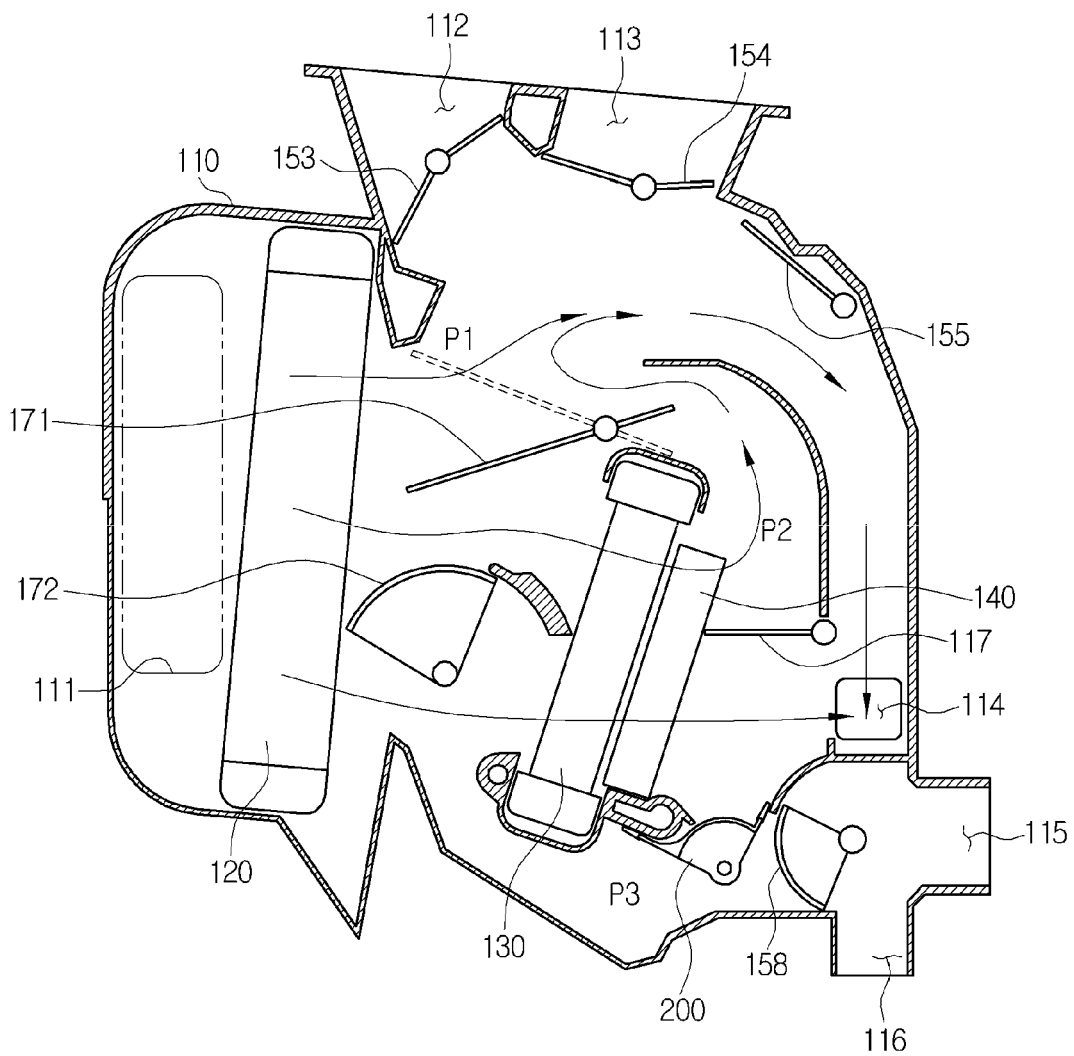
FIG. 14 is a view illustrating a front seat maximum heating mode of the air conditioner for a vehicle according to the preferred embodiment of the present invention.

FIG. 14 is a view illustrating a front seat maximum heating mode of the air conditioner for a vehicle according to the preferred embodiment of the present invention.

Referring to FIG. 14, all of the air passing through the evaporator 120 flows to the hot air passage P2, passes through the heater core 130 and the electric heater 140, and then, is discharged to the front seat floor vent 114.

In this instance, the first rear seat temperature door 172 opens the hot air passage P2. The front seat temperature door 171, as indicated by the dotted line of FIG. 14, perfectly opens the hot air passage P2. The second rear seat temperature door 200 closes the communication passage between the hot air passage and the rear seat cold air passage. Moreover, the rear seat mode door 158 closes the rear seat air passage. Furthermore, the hot air bypass door 117 opens the hot air bypass passage, so that some of the air passing through the heater core 130 and the electric heater 140 is directly discharged to the front seat floor vent 114 through the hot air bypass passage.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

The invention claimed is:

1. An air conditioner for a vehicle, which includes an air conditioning case having an air passage formed therein, and a cooling heat exchanger and a pair of heating heat exchangers which are disposed in the air passage of the air conditioning case to exchange heat with air passing through the air passage, the air conditioner comprising:
   the air passage including a front seat cold air passage, a hot air passage and a rear seat cold air passage;
   a front seat temperature door configured to adjust a degree of opening between the front seat cold air passage and a first part of the hot air passage;
   a first rear seat temperature door arranged between the cooling heat exchanger and the heating heat exchangers to adjust an opening degree of a second part of the hot air passage; and
   a second rear seat temperature door having an asymmetric dome, disposed downstream of the heating heat exchangers, and controlling an opening degree between the hot air passage and the rear seat cold air passage;
   wherein the pair of heating heat exchangers includes a heater core and an electric heater disposed downstream of the heater core, wherein the second rear seat temperature door is disposed adjacent to a lower end of the electric heater, and wherein the rear seat cold air passage is located downstream of the heating heat exchangers, wherein the heater core and the electric heater each have a bottom end and a top end;
   wherein a partition wall of the air conditioning case extends approximately in a horizontal direction toward the rear of the vehicle from the bottom ends of the heater core and the electric heater, and partitions the hot air passage from the rear seat cold air passage, wherein the horizontal direction is transverse to a vertical direction spanning between the top and bottom ends of the heater core;
   wherein the hot air passage and the rear seat cold air passage communicate with each other;
   wherein the second rear seat temperature door adjusts an opening degree between the rear seat cold air passage and a communication passage between the hot air passage and the rear seat cold air passage located downstream of the heating heat exchangers;
   wherein the second rear seat temperature door is pivotable about a door shaft and includes a hot air passage radial face extending radially relative to the door shaft over the hot air passage and a cold air passage radial face extending radially relative to the door shaft over the cold air passage at an angle relative to the hot air passage radial face, wherein the hot air passage and cold air passage radial faces are configured to engage the partition wall to limit pivoting of the second rear seat temperature door;
   wherein the dome of the second rear set temperature door has a first curvature surface adjacent to the hot air passage radial face and forming a convex curvature for maintaining a gap between the first curvature surface and the partition wall during pivoting of the rear seat temperature door, and a second curvature surface adjacent to the cold air passage and forming a concave surface for inducing smooth movement of air between the second curvature surface and the partition wall during pivoting of the rear seat temperature door;
   wherein in a mixing mode, the second rear seat temperature door is located between the rear seat cold air passage and the communication passage;
   wherein when the second rear seat temperature door is in the mixing mode or in a bi-level mode, air flowing in the hot air passage is not disturbed, so that there is no interference between an operational trace of the second rear seat temperature door and the electric heater;
   wherein the hot air passage radial face of the second rear seat temperature door has a first radial length from the door shaft to an end of the hot air passage radial face, and the cold air passage radial face of the second rear seat temperature door has a second radial length from the door shaft to an end of the cold air passage radial face, wherein the first radial length is shorter than the second radial length.

2. The air conditioner according to claim 1, wherein the second rear seat temperature door has a straight section which is formed on at least a part of the first curvature surface.

3. The air conditioner according to claim 1, wherein the first curvature surface and the second curvature surface form an inverted curve based on an inflection point between the first curvature surface and the second curvature surface.

4. The air conditioner according to claim 1, wherein the second rear seat temperature door includes a plurality of rigid reinforcing ribs which are arranged in the dome thereof, extend in a straight line at right angles to the door shaft, and spaced apart from one another in an axial direction of the door shaft.

5. The air conditioner according to claim 1, further comprising:
   a rear seat mode door which is arranged at the downstream side of the second rear seat temperature door to adjust an opening degree of a rear seat air outlet,
   wherein the air conditioner performs temperature control of a rear seat using the first rear seat temperature door and the second rear seat temperature door and controls opening and closing of the rear seat air outlet using the rear seat mode door.

6. The air conditioner according to claim 5, wherein in a maximum cooling mode, the second rear seat temperature door closes the communication passage between the hot air passage and the rear seat cold air passage located at the downstream side of the heating heat exchangers, and, in a maximum heating mode, the second rear seat temperature door closes the rear seat cold air passage.

7. An air conditioner for a vehicle, comprising:
   an air conditioning defining an air passage;
   a cooling heat exchanger, a heater core and an electric heater disposed in the air passage for exchanging heat with air passing through the air passage, wherein the heater core is positioned downstream from the cooling heat exchanger and the electric heater is positioned downstream of the heater core, and wherein the heater core and the electric heater each have a top surface and a bottom surface;
   the air passage including a front seat cold air passage, a hot air passage and a rear seat cold air passage;
   a front seat temperature door configured to adjust a degree of opening between the front seat cold air passage and a first part of the hot air passage;

a first rear seat temperature door arranged between the cooling heat exchanger and the heater core to adjust a degree of opening of a second part of the hot air passage;

a second rear seat temperature door located downstream of and adjacent to a lower end of the electric heater, and configured to control a degree of opening between the hot air passage and the rear seat cold air passage;

a partition wall positioned along the bottom ends of the heater core and the electric heater and partitioning the hot air passage from the rear seat cold air passage;

the second rear seat temperature door being pivotable about a door shaft and including a hot air passage radial face extending radially relative to the door shaft in the hot air passage and a cold air passage radial face extending radially relative to the door shaft in the rear seat cold air passage and angled relative to the hot air passage radial face to the hot air passage radial face, wherein the hot air passage and cold air passage radial faces are configured to engage the partition wall to limit pivoting of the second rear seat temperature door; and the second rear seat temperature door having a dome extending between the cold and hot air passage radial faces, wherein the dome has a first curvature surface adjacent to the hot air passage radial face and forming a convex curvature for maintaining a gap between the first curvature surface and the partition wall during pivoting of the second rear seat temperature door, and a second curvature surface adjacent to the cold air passage and forming a concave surface for inducing smooth movement of air between the second curvature surface and the partition wall during pivoting of the second rear seat temperature door.

* * * * *